United States Patent [19]
Frank et al.

[11] Patent Number: 6,003,930
[45] Date of Patent: Dec. 21, 1999

[54] VEHICLE WITH BUMPER AND DEFORMING ELEMENT

[75] Inventors: Simon Frank, Tengen; Werner Graf, Engen, both of Germany

[73] Assignee: Alusuisse Technology & Management Ltd., Switzerland

[21] Appl. No.: 09/031,157

[22] Filed: Feb. 26, 1998

[30] Foreign Application Priority Data

Mar. 11, 1997 [CH] Switzerland .............................. 578/97

[51] Int. Cl.$^6$ ................................................. B62D 27/04
[52] U.S. Cl. ............................................ 296/133; 293/132
[58] Field of Search .................... 293/132, 133; 180/371, 377

[56] References Cited

U.S. PATENT DOCUMENTS

| | | | |
|---|---|---|---|
| 3,997,207 | 12/1976 | Norlin ................................. | 293/133 X |
| 4,029,350 | 6/1977 | Goupy et al. ....................... | 293/133 X |
| 4,154,469 | 5/1979 | Goupy et al. ....................... | 293/133 X |
| 4,252,355 | 2/1981 | Goupt et al. ....................... | 293/132 X |
| 4,413,856 | 11/1983 | McMahan et al. ................. | 293/132 X |
| 4,889,374 | 12/1989 | Choun ................................. | 293/132 |
| 5,056,840 | 10/1991 | Eipper et al. ....................... | 293/133 X |
| 5,201,912 | 4/1993 | Terada et al. ....................... | 293/133 X |
| 5,579,699 | 12/1996 | Dannawi et al. ................... | 293/133 X |
| 5,785,367 | 7/1998 | Baumann et al. .................. | 293/133 |
| 5,803,514 | 9/1998 | Shibuya et al. .................... | 293/133 |

FOREIGN PATENT DOCUMENTS

| | | |
|---|---|---|
| 0705994 | 4/1996 | European Pat. Off. . |
| 0734908 | 10/1996 | European Pat. Off. . |
| 2698932 | 6/1994 | France . |
| 4401865 | 8/1994 | Germany ............................. 293/133 |
| 2299551 | 10/1996 | United Kingdom . |
| 9703865 | 2/1997 | WIPO . |

OTHER PUBLICATIONS

Patent Abstracts of Japan, vol. 009, No. 158 (M–393), Jul. 3, 1985 & JP 60 033151, Feb. 20, 1985.

*Primary Examiner*—Joseph D. Pape
*Attorney, Agent, or Firm*—Bachman & LaPointe, P.C.

[57] ABSTRACT

A vehicle features a bumper which runs transverse to the longitudinal direction of the vehicle and which is attached to the vehicle by at least one deforming element. The deforming element is essentially in the form of a tube-shaped length of section of light weight metal having its longitudinal axis lying in the longitudinal direction of the vehicle and is divided into longitudinal chambers by inner struts.

13 Claims, 3 Drawing Sheets

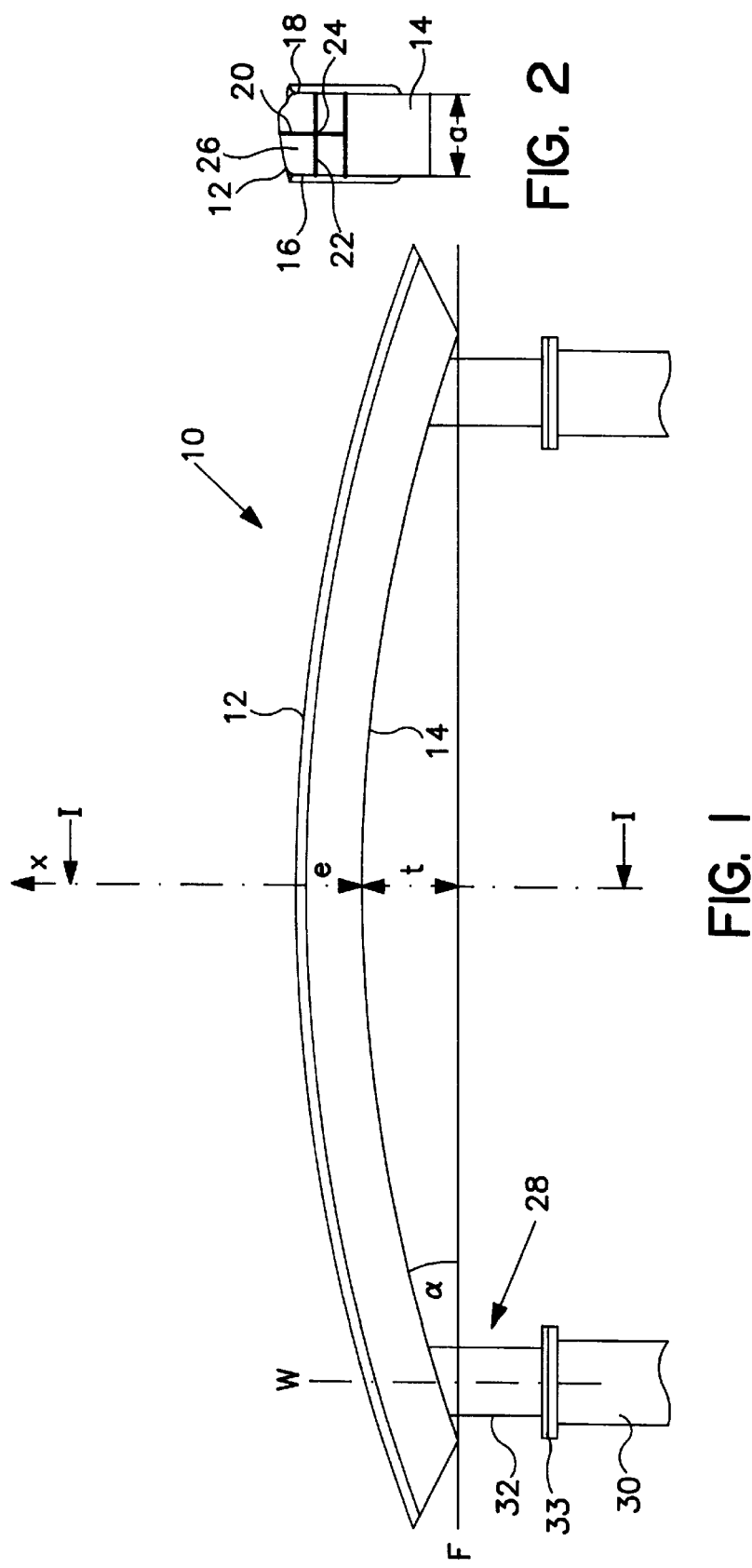

VEHICLE WITH BUMPER AND DEFORMING ELEMENT

BACKGROUND OF THE INVENTION

The invention relates to a vehicle having a bumper which runs transverse to the longitudinal direction of the vehicle and is attached to the vehicle by at least one deforming element that is essentially in the form of a tube-shaped length of section of light-weight metal having its longitudinal axis lying in the longitudinal direction of the vehicle.

A large number of devices for securing bumpers to a vehicle is known. It is also known to attach bumpers to vehicles via deforming elements on the longitudinal members of the vehicle frame, this in order to increase the capacity to absorb the energy of deformation entering the bumper during collision.

A known deforming element comprises an upset steel pipe which is attached to the bumper via attachment plates on the longitudinal member of the vehicle frame. This deforming element is characterized by practically uniform force of deformation throughout the deformation process. This desirable characteristic is obtained, however, only provided the direction of the force of deformation coincides with the longitudinal axis of the tube. Even when the deviation from that condition is only relatively small, the upsetting action does not take place and, instead, the tube is bent to the side without the desired absorption of energy. On collision with a soft obstacle, the pipe penetrates the obstacle and is not able therefore to exercise its full capacity for absorbing the incoming energy. A further disadvantage of the upset tube is its high cost of manufacture.

Efforts have already been made to employ hollow aluminum sections as deforming elements. However, relatively coarse folds forming during compression markedly reduce the capacity to absorb the incoming energy. Attempts have also been made to achieve better folding behavior by controlling the manner of folding; by this means however it has been possible to achieve only insignificant improvement.

SUMMARY OF THE INVENTION

The object of the present invention is therefore to develop a deforming element for a vehicle such as is described above, by means of which as constant as possible force of deformation is maintained throughout the deforming process and which is still fully effective even when the direction of the incoming force deviates markedly from the longitudinal axis of the deforming element. Further, it should be possible to manufacture the deforming element at a favorable cost, and even on impacting a soft obstacle, the element should exercise its capacity for absorbing energy.

That objective is achieved in that the section is divided into at least two longitudinal chambers by means of at least one longitudinal inner strut.

The result of dividing the section into a plurality of chambers according to the invention is a uniform series of folds that are small in height and as a consequence have excellent capacity to absorb the incoming energy of deformation.

The section may have any cross-sectional shape and feature as many inner struts as desired arranged in any manner desired. Preferred, however, is an extruded section having an essentially rectangular cross-section, that exhibits at least two inner struts lying transverse to each other.

The breadth of the length of section is usefully greater than the breadth of the bumper. Further, the breadth of the section may be increased locally by two longitudinal additional chambers.

The end of the section next to the bumper is preferably shaped such that a force of deformation striking the section in the longitudinal direction of the vehicle continuously deforms the section. With that in mind, the section may feature a recess. In an alternative version the section is given a slope other than an angle of 90° to the longitudinal axis of the section.

The deforming element is normally bolted or riveted to the bumper; however, other means of attachment may be employed. In order to make the connection to the longitudinal members of the vehicle frame, a connecting plate may be welded to the section and either welded or bolted to the longitudinal members of the vehicle frame.

A simple and cost-favorable manner of manufacturing the length of section is to make this from an aluminum alloy extrusion.

BRIEF DESCRIPTION OF THE DRAWINGS

Further advantages, features and details of the invention are revealed in the following description of preferred exemplified embodiments of the invention and with the aid of the drawings which shows schematically in FIG. 1 the plan view of a bumper;

FIG. 2 a cross-section through the bumper in figure along the line I—I;

DETAILED DESCRIPTION OF PREFERRED EMBODIMENTS

Figure 3:
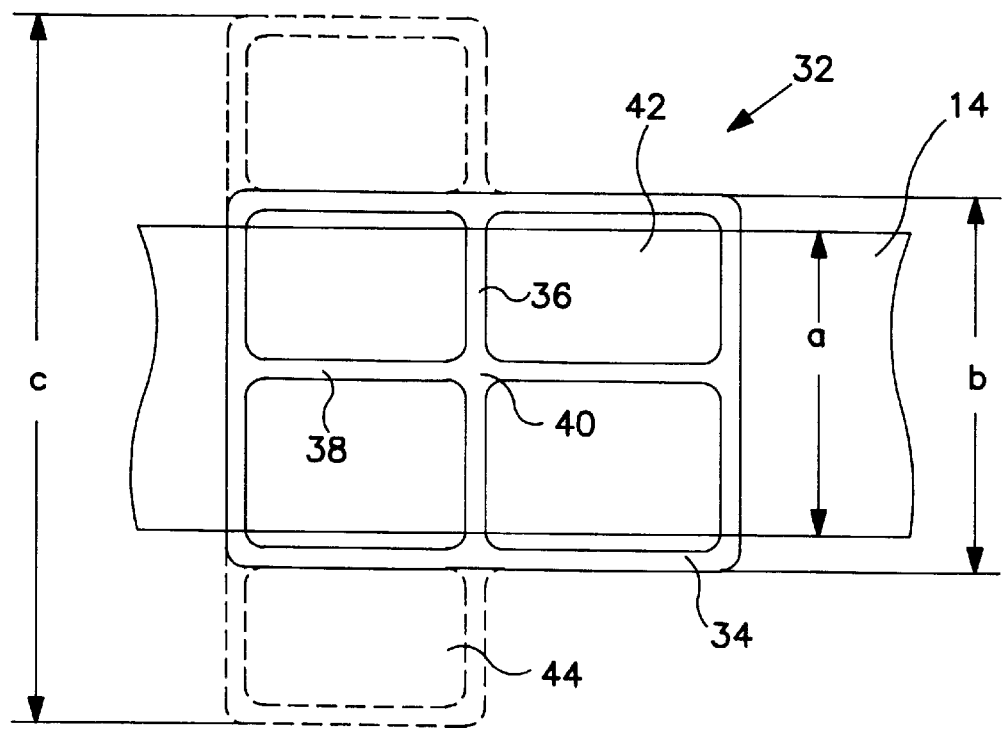
FIG. 3 a cross-section through a deforming element.

A bumper 10 of a private car, which for reasons of clarity is not shown here, is attached via deforming elements 28 to the longitudinal members 30 of the vehicle frame. The bumper 10 is made of extruded aluminum and is curved such that the middle is a distance t from the imaginary front line F of the vehicle.

As shown in FIGS. 1 and 2, the bumper 10 exhibits two walls 12, 14 a distance I from each other, which are complimented by the transverse walls 16, 18 to form a box-shaped hollow section. As installed, the wall 12 facing away from the vehicle corresponds to the outer or compression flange receiving the force of impact, while the section wall 14 facing the vehicle represents the inner or tension flange.

Situated between the two transverse walls 16, 18 is a transverse strut 20 which joins the two section walls 12, 14 and forms a line of intersection with the vertical strut 22 running between the transverse walls 16, 18. The box-shaped hollow section forming the bumper is divided into chambers 26 by the intersecting transverse strut 20 and the vertical strut 22. These chambers form deforming parts that are deformed under the action of the a frontal force P striking the bumper 10 and dissipate therefore a fraction of the energy of impact.

The deforming element 28 shown in FIG. 1 features a length of section 32 at one end of which is welded an attachment plate 33 for attaching the deforming element 28 to the longitudinal members of the vehicle frame. The length of section 32 is made from an extruded aluminum alloy section; the attachment plate 33 is likewise made from an aluminum alloy. The end of the length of section 32 facing the bumper 10 is inclined thus forming an angle α of e.g. 10° with the imaginary line F running perpendicular to the longitudinal direction of the vehicle. The inclined end face of the length of section 32 lies therefore against the inner flange 14 of the bumper 10. The attachment of the length of section 32 or the deforming element 28 to the bumper 10 may be made via a rivet or a bolted connection. To that end e.g. an attachment plate, not shown in the drawing, may be welded onto the length of section 32.

The length of section 32 of a deforming element shown in FIG. 3 features outer section walls 34 which form an essentially rectangular box-shaped hollow section. At the middle between two outer, facing section walls 34 are the inner struts 36, 38 that join the outer walls 34 and intersect along a line 40.

The length of section 32 is divided into four longitudinal chambers 42 by the inner struts 36, 38. Shown in FIG. 3 are optional additional chambers 44.

The breadth b of section 32 is greater than the breadth a of the inner strut 14 of the bumper 10. This difference in dimension is increased by the larger breadth c in the region of the additional chamber 44.

Figure 4:
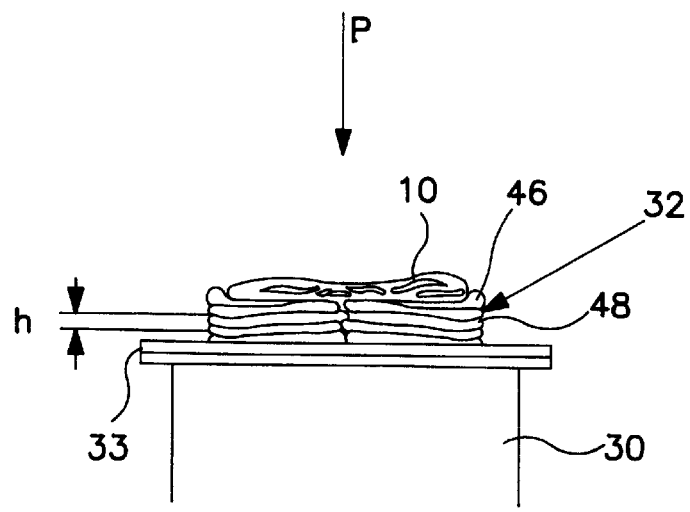
FIG. 4 a longitudinal cross-section through a crushed bumper with a deforming element.

The significance of the larger dimension of the length of section shown in FIG. 3 over that of the bumper 10 or its inner strut 14 can be seen from FIG. 4. Under the action of a frontal force P the bumper 10 and the length of section 32 of the deforming element 28 are crushed along the direction of the longitudinal axis w of the section which lies parallel to the longitudinal axis x of the vehicle. As a result of this crushing action the length of section 32 is deformed, clamping itself around the bumper while forming a series of folds 46 in the process. As a consequence of the section 32 wrapping itself partially around the bumper 10 stability is achieved, countering tilting of the bumper 10 and increasing its ability to keep its shape; this as a whole improves the capacity for absorbing the incoming energy.

FIG. 4 also shows the folds 48 of height h formed in the length of section 32 as a result of the crushing of the deforming element, said folds essentially being influenced by the division of the section 32 into a plurality of chambers.

Figure 5A:
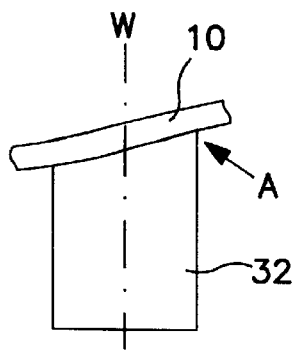
FIG. 5a–c side elevation of a bumper with deforming element in various stages of deformation.
Figure 5B:
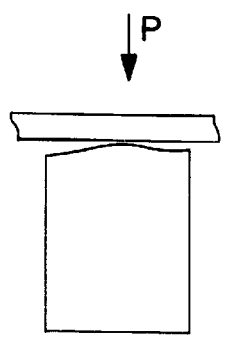
Figure 5C:
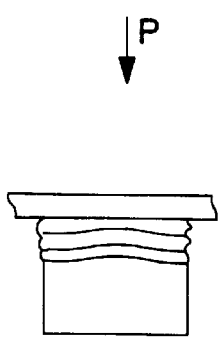
Figure 6:
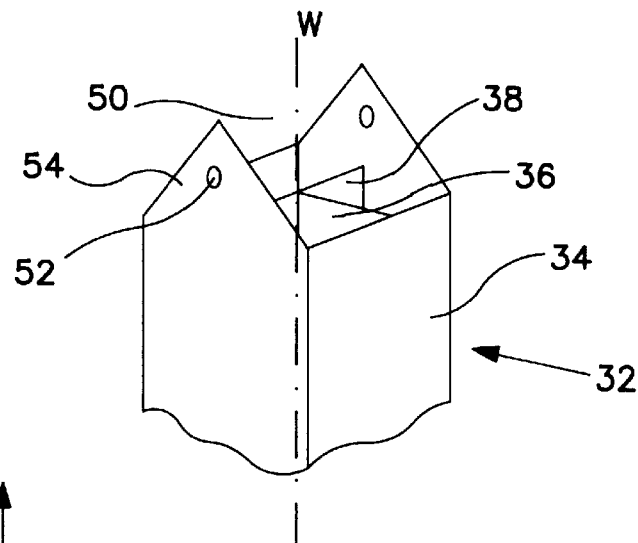
FIG. 6 a perspective view of a further version of a deforming element.

Under the action of a frontal force P on the bumper 10 deformation is initially directionally straight i.e. rotation occurs around the axis in region A, the highest point of the inclination of the length of section 32 (FIG. 5a), causing the tension strut 14 to be raised from the inclined slope of the section 32. Region A forms the sole area of contact for the bumper 10. In the next stage of deformation, as shown in figure 5b, simultaneously or after the deformation of the bumper 10, section 32 is deformed in region A. As a result, the section 32 is continuously deformed and, after an initial amount of deformation, the deformation process progresses through the whole cross-section of the part 32. A further possibility for continuously increasing the degree of deformation of the length of section 32 is shown in the version illustrated in FIG. 6. There, at the end facing the bumper 10, the section 32 features a recess 50 that partially accommodates the bumper 10, such that residual section wall parts 54 exhibit holes 52 for attaching the bumper 10. In that version the section wall parts 54 deform initially. Thereafter deformation occurs continuously, without excessive force, over the whole cross-section of the length of section 32.

Figure 7:
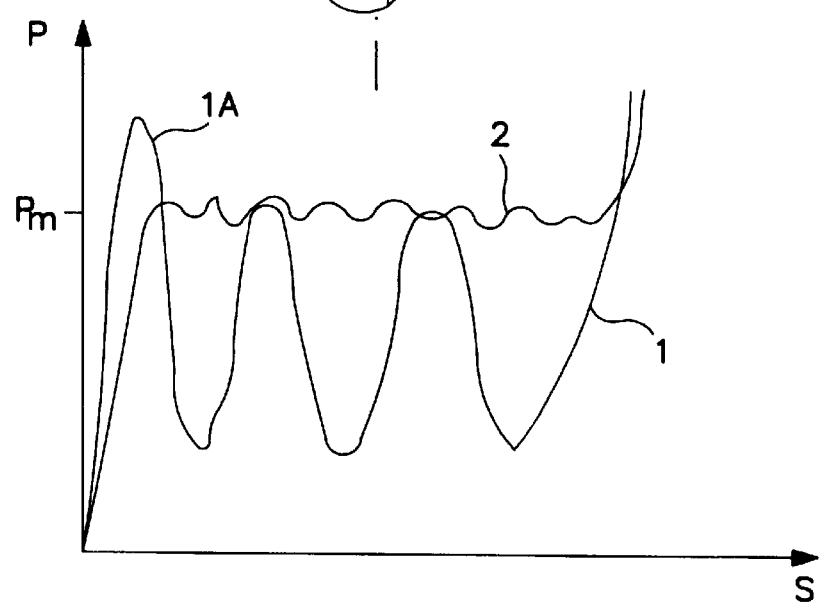
FIG. 7 a load-displacement diagram from loading trials made on deforming elements.

The load-displacement diagram in FIG. 7 shows the dependence of the compressive force P on the distance s of application during a loading test carried out on a length of section by applying the load P along the longitudinal axis w of the section. The curve 1 is typical of a state of the art hollow section without inner strut. The forming of coarse, non-uniform folds leads to extreme fluctuations in the deformation force. Also to be seen in curve 1 is a region 1a which corresponds to the initial increase in the force of deformation up to the start of actual deformation. This force, in excess of an average deformation force $P_m$, is a result of the immediate action of the force on the full cross-section of the length of section.

Curve 2 shows the change in force during the deformation of a length of section 32 according to the invention. By arranging the inner struts 36, 38 to divide the interior into a plurality of longitudinal section chambers 42 the result is uniform folds of small height h, which leads to an essentially uniform average force of deformation $P_m$. As the surface under the force-distance curve represents the energy of deformation, it can be readily seen from FIG. 7 that the design of section length 32 according to the invention provides considerably improved capacity for absorbing incoming energy compared to that of a conventional section length without inner struts.

We claim:

1. Vehicle including: a bumper which runs transverse to the longitudinal direction of the vehicle; at least one deforming element attaching said bumper to the vehicle, said deforming element being essentially in the form of a tube-shaped length of section made by extrusion of an aluminum alloy having its longitudinal axis lying in the longitudinal direction of the vehicle; wherein the length of section is divided into at least four longitudinal chambers by means of at least two inner struts arranged perpendicular to each other and intersecting each other.

2. Vehicle according to claim 1, wherein the length of section is essentially rectangular in cross-section.

3. Vehicle according to claim 1, wherein the breadth (b) of the length of section is greater than the breadth (a) of the bumper.

4. Vehicle according to claim 3, wherein the breadth (b) of the length of section is extended by at least one longitudinal additional chamber.

5. Vehicle according to claim 1, wherein the end of the section neighboring the bumper is designed such that a force of deformation acting on the section in the longitudinal direction of the vehicle causes the deformation of the section to progress in a continuous manner.

6. Vehicle according to claim 5, wherein the section features a recess.

7. Vehicle according to claim 5, wherein the end of the section neighboring the bumper is inclined at an angle from a plane running 90° to the longitudinal axis of the vehicle.

8. Vehicle according to claim 1, wherein the deforming element is at least one of bolted and riveted to the bumper.

9. Vehicle according to claim 1, wherein the deforming element is at least one of bolted and riveted to a longitudinal member of the vehicle frame of the vehicle via an attachment plate welded to the length of section.

10. Vehicle according to claim 4, including two longitudinal additional chambers.

11. Vehicle according to claim 1, wherein said longitudinal chambers are substantially equal in size.

12. Vehicle according to claim 1, wherein a frontal force on the bumper crushes the deforming element into a series of folds.

13. Vehicle according to claim 1, wherein the bumper has a rear face, and the deforming element is between the vehicle and the rear face and is attached to said rear face.

* * * * *